United States Patent
Stieger et al.

[15] 3,682,068
[45] Aug. 8, 1972

[54] LIGHT ENVELOPE

[72] Inventors: Frank M. Stieger, Newton Highland, Mass.; Polaroid Corporation, Cambrige, Mass.

[22] Filed: June 11, 1969

[21] Appl. No.: 832,108

[52] U.S. Cl..................................95/39, 260/80.7
[51] Int. Cl..........................................G03b 17/04
[58] Field of Search.............95/11, 32, 33, 39, 13; 260/80.7

[56] References Cited

UNITED STATES PATENTS

| | | |
|---|---|---|
| 1,642,935 | 9/1927 | Mihalyi.....................95/32 X |
| 3,437,025 | 4/1969 | Rice...........................95/39 |
| 3,506,627 | 4/1970 | Zaim......................260/80.7 |
| 3,447,437 | 6/1969 | Tiffany...................95/13 R |
| 3,543,661 | 12/1970 | Rosen....................95/11 R |

Primary Examiner—Samuel S. Matthews
Assistant Examiner—Fred L. Braun
Attorney—Brown and Mikulka and Sheldon W. Rothstein

[57] ABSTRACT

An opaque envelope for utilization in a photographic camera, said envelope comprising a light-transmitting chamber which excludes extraneous light, and which is fabricated of an ethylene-propylene-diene rubber.

4 Claims, 2 Drawing Figures

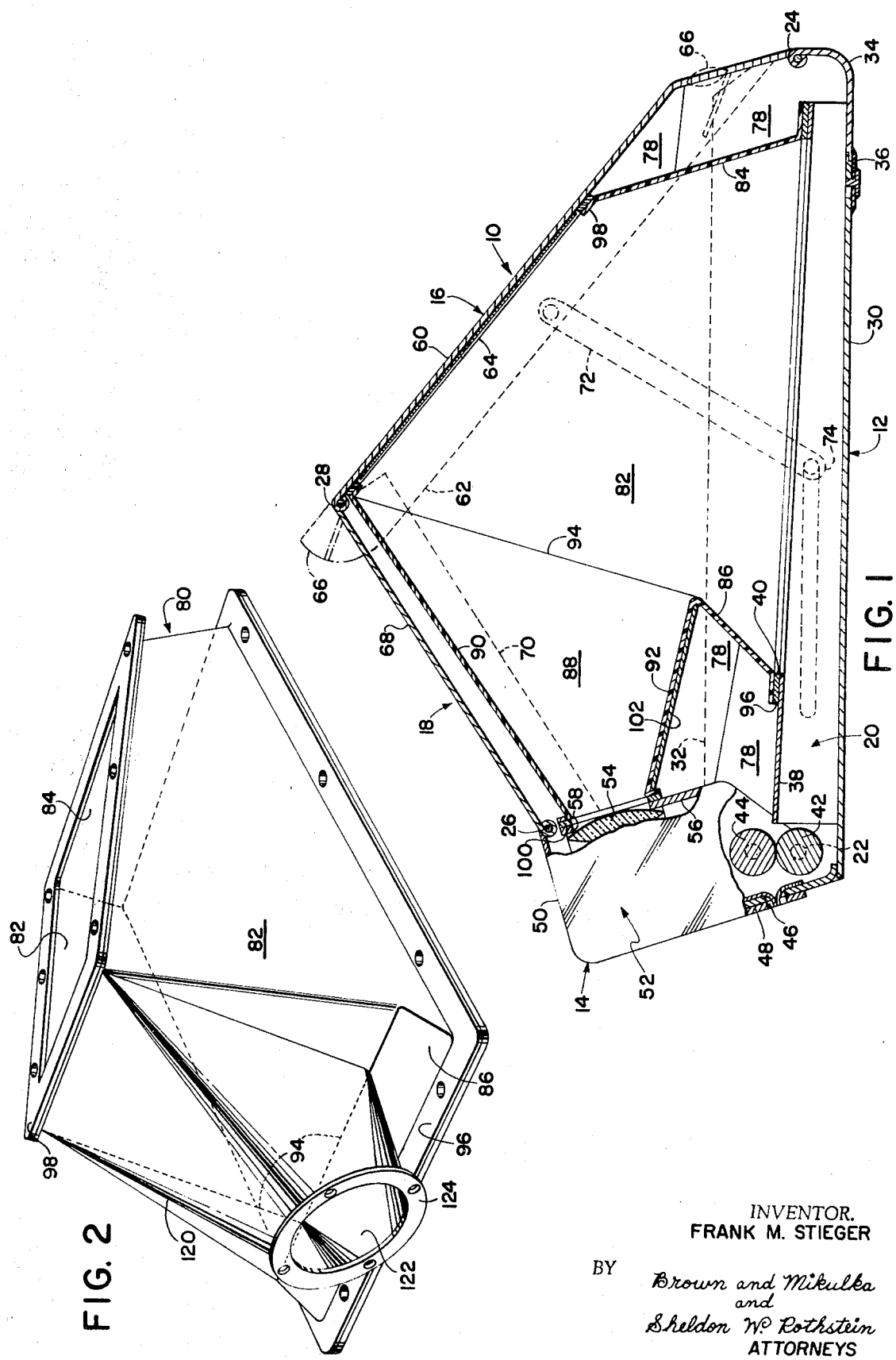

3,682,068

LIGHT ENVELOPE

The present invention is concerned with a light-proof envelope especially fabricated for utilization in a photographic camera and particularly a compact, folding, self-developing camera of the type shown and described in the copending U.S. Pat. applications of Edwin H. Land, Ser. No. 655,850, filed July 25, 1967 now abandoned; Irving Erlichman, Ser. No. 655,859, filed July 25, 1967 now U.S. Pat. No. 3,479,941, issued Nov. 25, 1969; and Irving Erlichman, Ser. No. 809,143, filed Mar. 21, 1969. These applications describe a camera having four rigid housing sections coupled to one another at their ends for pivotal movement about parallel axes. Exposure means, such as a conventional lens and shutter, are mounted in a first of the housing sections, a mirror is mounted in a second of the housing sections and means, such as a conventional focal plane plate, are provided in a third housing section for locating a photosensitive image-receiving medium in position for exposure to light transmitted by the lens and reflected by the mirror. The first and second housing sections are pivotally coupled to opposite ends of the third housing section and the fourth housing section, joins the first and second housing sections which are pivotable between an operative or extended position in which the housing sections are spaced apart from one another to provide a light path from the lens via the mirror to the recording medium, and a folded or collapsed position in which the first and third housing sections are disposed more or less end to end with respect to one another and the second and fourth housing sections are located in facing relation to the first and third housing sections to provide a very compact structure.

The aforementioned Erlichman application, Ser. No. 655,859, describes a camera structure of this type including a pair of fan type bellows located between the housing sections at the sides thereof and cooperating with the housing sections to provide the lighttight chamber through which light is transmitted from the lens via the mirror to the recording medium. Each of these bellows comprises several interlocking elements joined to one another so as to provide a lighttight structure.

Objects of the present invention are: to provide a folding camera including an opaque envelope for utilization in a photographic environment and particularly an envelope comprising means for forming a path for light admitted through a lens opening while preventing admission of ambient light into the camera; to provide a compact, economically fabricated structure; and to provide means of the type described in the form of an easily fabricated elastic envelope.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 1 is a sectional view of a camera embodying a preferred lighttight envelope of the present invention, which is outlined in bold lines, the section being taken substantially midway between the sides of the camera; and FIG. 2 is a perspective view of a preferred lighttight envelope boldly depicted in the camera of FIG. 1.

Reference is now made to FIG. 1 of the drawing wherein there is shown a camera, generally designated 10, comprising a housing including a first or rear section 12, a second housing section 14, a third section 16, and a fourth section 18. The first housing section 12 may be characterized as the rear housing section and is adapted to hold a film pack 20 or assemblage of film units comprising a plurality of film units adapted to be exposed within the film pack and advanced through the camera. The first housing section is pivotally connected near one end to second housing section 14 at pivots 22 and at its opposite end to third housing section 16 at a hinge 24. Housing sections 14 and 16 are coupled to fourth housing section 18 at, respectively, hinges 26 and 28 having axes arranged in generally parallel relation with the axis of pivots 22 and hinge 24. The housing sections cooperate to form, in effect, a four-bar linkage which is movable between an operative or extended position in which the housing sections are spaced apart to provide four sides of a chamber.

First housing section 12 comprises a generally rectangular rear wall 30, dependent side walls and a door 34, pivoted about hinge 24, and adapted to be retained in a closed position by a latch 36 and to be opened to permit loading of a film pack 20 into the camera housing.

The camera is adapted to be employed with a film pack 20 of the type shown and described in greater detail in the aforementioned Land application and incorporating a plurality of film units of the type shown and described in the U.S. Pat. application of Edwin H. Land, Ser. No. 622,287, now Pat. No. 3,615,539, and Edwin H. Land et al., Ser. No. 622,286, now abandoned, both filed Mar. 10, 1967. Film pack 20 includes a plurality of film units arranged in stacked relation with the film unit closest the forward wall of the pack located in position for exposure and each film unit is adapted, following exposure, to be withdrawn from the film pack and processed to form a visible image by a processing mechanism incorporated in the camera. To position the film pack and the film units therein for exposure, the first housing section includes an inner wall or focal plane plate 38 spaced from rear wall 30 in position to locate the forwardmost film unit for exposure and including a rectangular exposure aperture 40 through which light may be transmitted for exposing the forwardmost film unit in the film pack.

The processing system of the camera generally includes a pair of pressure-applying rollers 42 and 44 mounted in juxtaposition near the leading end of the film pack and means, described in detail in the aforementioned application Ser. No. 655,850, for feeding the exposed film units into the bite of the rollers and rotating the rollers to distribute a processing liquid within the exposed film unit while advancing the latter from the film pack between the rollers and from the camera. Rollers 42 and 44 may be mounted in either the first or second housing sections or, as shown, roller 42 is mounted in both with the axis of pivots 22 being coincident with the axis of roller 42. An opening 46 is provided in the second housing section to permit advancement of a film unit, during processing, between rollers 42 and 44 from the camera housing.

Second housing section 14 is generally parallelepiped shaped, is engaged between side walls 32 of the first housing section and is pivotable with respect to the first housing section about the axis of roller 42. The second housing section includes outer wall 48 which, in the folded position of the camera housing, is located in essentially the same plane as rear wall 30, and in the extended or operative position of the camera housing, functions as the forward wall of the camera. Suitable openings are provided to admit light into the camera lens, and the second housing section includes an outer wall 50 which, in the folded position of the camera, constitutes an end wall of the camera and in the extended position of the camera functions as one of the upper walls of the camera housing; and side walls 52 engaged between side walls 32 of the rear housing section. A conventional photographic objective lens designated 54 is mounted within the second housing section with the lens axis disposed perpendicularly to the outer or forward wall 48 such that light transmitted through the lens along the axis is directed, in the operative position of the camera housing, away from and at an acute angle with respect to the focal plane plate; and in the folded position of the camera housing, the axis of lens 54 extends approximately perpendicularly to the focal plane plate. The second housing section also includes an inner or rear wall 56 disposed in generally parallel relation with outer wall 48 and provided with an aperture 58 for transmitting light from lens 54.

Third housing section 16 comprises an outer wall 60 pivotally connected at one end via hinge 24 to rear housing section 12, and dependent side walls 62 engaged between side walls 32 of the rear housing section. A substantially planar and preferably front surface mirror 64 is mounted on the inside of wall 60 for reflecting light from lens 54 toward a film unit positioned for exposure behind aperture 40 in focal plane plate 48. The angle at which the axis of lens 54 intersects mirror 64 in the operative position of the camera housing is preferably greater than 45° in order to provide for a more compact camera structure and mirror 64 is trapezoidal in shape with the end of the mirror closest hinge 28 and lens 54 being narrower than the opposite end of the mirror.

A conventional view finder, generally designated 66, may be mounted within third housing section adjacent one side of mirror 64 and includes entrance and exit apertures provided with mirrors at opposite ends of the third housing section.

Fourth housing section 18 comprises an outer wall 68 pivotally connected at one end at hinge 28 to outer wall 60 of third housing section 16 and along its opposite end at hinge 26 to the second housing section 14, and dependent side walls 70 engaged between side walls 62 of third housing section 16 and outside of the ends of second housing section 14 so that in the folded position of the camera housing, the third and fourth housing sections are located between side walls 32 of the first housing section and the side walls of the fourth housing section are located between the side walls of the third housing section. The fourth housing section functions essentially as a connection or a link between the second and third housing sections, and means including a rigid link 72 pivoted at one end on third housing section 16 and engaged for pivoting and sliding movement at its opposite end on first housing section 12, are provided for retaining the camera housing in the operative or erect position shown. These erecting means, described in greater detail in the aforementioned Erlichman application, Ser. No. 655,859, include a manually operable button 74 and a detent (not shown) on the first housing section for retaining link 72 against movement and thereby secure the housing sections in an erect position.

A fan-like bellows including a plurality of blades pivoted about a single axis (not shown) on second housing section 14 and covered at their ends and along the sides of the two outermost blades by side walls 32, 62 and 70 are generally provided on opposite sides of the camera housing to form a protective outer housing for the camera. The blades may be planar or slightly curved to give them rigidity but otherwise comprise a very simple construction inasmuch as the bellows or housing walls provided by the blades are not required to be lighttight and merely function to provide collapsible outer walls for the camera housing.

In accordance with the present invention, the camera described in FIG. 1 includes a very simple and inexpensive means for light sealing the camera housing to provide a lighttight optical path between the lens mirror and focal plane plate. This means contributes to the overall simplicity and low cost of the camera structure because it makes it unnecessary to take special precautions with the components of the camera housing including the hinges, bellows and viewfinder, to render these components lighttight. In the form shown in FIG. 1 of the drawing, these means comprise an envelope 80 formed of a thin opaque elastomeric material comprising an ethylene-propylenediene terpolymer which is discussed in greater detail below.

Referring now to FIG. 2 in conjunction with FIG. 1, envelope 80 includes a main body section comprising side walls 82 and end walls 84 and 86 joined to one another to form substantially truncated pyramid or tapered tube including openings at opposite ends; and an extended section, 120, which extends between end wall 86 of the main body section and to rear wall 56 of the second housing section, the configuration of end wall 86 comprising a slightly angled section below the lower attachment point of tube 120. The lens opening in rear wall 56 is, preferably, circular and extended section 120 of the envelope includes a corresponding circular opening 122 surrounded by a relatively circular rigid means adapted to be secured to rear wall 56 in surrounding relation to the lens opening therein. This relatively rigid attachment means may take the form of a flange designated 124 or other means for facilitating a secure lighttight coupling between extended section 120 and the rear wall of the second housing section. Extended section 120 tapers from a generally rectangular or trapezoidal-shaped configuration where it joins end wall 86 at the border of opening 94 therein to a generally circular configuration at opening 122. Envelope 80, in the extended position shown thus provides a chamber or container including a tapered main section open at opposite ends and a tapered secondary section joined to one side of the main section and open at its end. Rigid frames 96, 98, and 124 are provided at the openings in envelope 80 in lighttight relationship with the walls thereof. Frames may be rectangular in shape with the opening in frame 96 corresponding in size and shape to exposure aperture 40 in focal plane plate 38 and the opening in frame 124 being sufficiently large so as not to vignette or block lens 54. Frame 98 is preferably substantially trapezoidal in shape and includes an opening corresponding to mirror 64. Frames 96, 98, and 100 provide means for securing envelope 80 in a lighttight manner to, respectively, focal plane plate 38 around aperture 40, rear wall 60 around mirror 64 and inner wall 56 around aperture 58 to provide a lighttight chamber through which light may be transmitted from lens 54 to mirror 64 and thence through aperture 40 to an image-recording medium located behind the aperture.

The dimensions of the walls of envelope 80 are such that the walls are in a substantially unstressed condition and assume generally planar configurations when the camera housing is in an operative or extended condition. Such walls are relatively thin, e.g., having a thickness of less than 30 mils and preferably on the order of about 15–20 mils. The configuration of the envelope of the present invention is such that it provides a light path from the lens, ultimately to a photosensitive film element, so as to eliminate all ambient light which is extraneous to the production of the desired photographic image.

As will be appreciated, the material comprising the novel light-conducting element of the instant invention must be capable of remaining operative for the life of the camera in which it is incorporated which, under ordinary conditions, is arbitrarily assumed to be fifteen years. The material must be capable of being formed into the desired configuration by conventional, economical techniques, as more fully discussed below; must remain operative throughout a range of −20° to 200° F.; should have a Shore A durometer hardness of about 40 to 80; must not assume a substantial tensile set; must be capable of more than 100 percent elongation; must possess good abrasion resistance; must be capable of being rendered opaque; and must be photographically inert.

It has been found that terpolymers comprising ethylene, propylene and a diene provide the above-enunciated properties to the light-conducting envelope contemplated by the instant invention. These materials are well known to rubber chemists and are currently identified as EPDM rubbers in the ASTM designation D1418-58T. The manufacture of such polymers is generally disclosed, for example, in U.S. Pat. Nos. 2,933,480 and 3,000,866.

The terpolymers utilized in the context of the present invention consist preferably of materials comprising 35 to 80 mole percent ethylene, 1 to 15 mole percent diene, preferably non-conjugated diene comprising at least 6 carbon atoms; and 5 to 64 mole percent propylene.

Among the dienes which may be used to form the terpolymers of the present invention are ethylidene norbornene; dicyclopentadiene; cyclooctadiene-1,5; cyclooctadiene1,4; cyclooctadiene-1,6; cyclododecadiene-1,7; cyclododecatriene-1,5,9; cycloheptadiene-1,4; cyclohexadiene-1,4; methylenenorbornene; 2-methylpentadiene-1,4; hexadiene-1,5; heptadiene-1,6; methyltetrahydroindene; hexadiene-1,4; etc.

Polymerization of the components of the rubber comprising the light-conducting unit of the present invention is carried out by conventional techniques using conventional catalysts of, for example, the Ziegler type. See, for example, U.S. Pat. Nos. 2,933,480; 3,000,866; 3,222,333; and 3,280,082. After recovering the polymerized material various addenda may be milled or calendered therewith to provide various desired properties to the ultimate product after it has been formed and vulcanized. Such materials include vulcanizing agents, accelerators, antioxidants, pigments, fillers, etc., all comprising materials well known to the rubber fabrication art.

The ethylene-propylene-diene terpolymers of the present invention are capable of bonding with moderately high levels of carbon black which provides to the ultimate product the requisite opacity, functional crosslinking, and enhanced physical properties. Carbon black loadings of more than 70 % are possible and, if desired, other pigments may be used and/or some of the carbon black may be substituted with titanium dioxide to provide a greyish colored opaque material.

Since the presence of sulfur may provide a deleterious effect to the photographic functionality of the process in which the light-conducting element is to be utilized it has been found that non-sulfurous vulcanization is highly desireable. Preferable vulcanizing agents comprise peroxides, for example, dicumyl peroxide; 2,5-bis(tertiary amylperoxy)-2,5-dimethylhexane; 2,5-bis(tertiary butyl peroxy)-2,5-dimethylhexyne-3; tertiary butyl perbenzoate; 2,5-bis(tertiary butyl peroxy)-2,5-dimethylhexane; 1,1'-ethylene-bis [(1-tertiary amyl peroxy)cyclohexane]; 2,5-bis(tertiary butyl peroxy)-2,5-diphenylhexane; etc.

Vulcanizing agents of the bis-vinylene type may also be used and include, for example, ethylene diacrylate; trimethylene diacrylate; tetramethylene diacrylate; pentamethylene diacrylate; cyclohexylidene diacrylate; bis-acrylate of diethylene glycol; 1,4-butanedimethacrylate; the methacrylic ester of allyl carbonol; etc.

The mixture of terpolymer and various adjuncts is preferably formed into suitable "biscuits" for molding by conventional techniques, e.g., by compression, transfer, injection, etc. Such techniques inherently provide the thermal stimulus necessary for vulcanization of the terpolymer.

The specification has been primarily directed toward a specific light path envelope as depicted in the drawings. It is to be understood, however, that, for purposes of the present invention, applicant claims the utilization of the disclosed polymeric material for light path envelopes, whether they be of the type designated in the drawings or others, which may be utilized in a photographic environment.

Since certain changes may be made in the above product without departing from the scope of the invention herein involved, it is intended that all matter contained in the above description or shown in the accompanying drawing shall be interpreted as illustrative and not in a limiting sense.

What is claimed is:

1. A molded opaque light path envelope for use in a folding camera, said envelope having:
   - a main body section of generally frustro-pyramidal shape including openings at opposite ends and in a wall thereof; and
   - a secondary section in the shape of a tapered tube open at one end and joined at its other end to said wall of said main body section surrounding said opening therein; and
   - attachment means secured to said sections around said openings at said ends thereof for attaching said envelope to said camera at said openings;
   - said main body section having a wall thickness of less than 30 mils;
   - said secondary section having a wall thickness of less than 20 mils.;
   - said envelope comprising a vulcanized, photographically inert terpolymer of 35 to 80 mole percent ethylene, 5 to 64 mole percent propylene, and 1 to 15 mole percent diene and sufficient carbon black to render said terpolymer opaque;
   - said carbon black containing terpolymer possessing, over a temperature range of −20° to 200° F., a Shore A durometer hardness of 40 to 80, the capability of repeated elongations of more than 100 percent without flexural cracking, negligible tensile set and good abrasion and tear resistance.

2. An envelope as defined in claim 1 wherein said carbon black level is more than 70 percent by weight.

3. An envelope as defined in claim 1 wherein the vulcanization of said terpolymer is non-sulfurous.

4. An envelope as defined in claim 1 wherein said diene comprises a non-conjugated diene having at least six carbon atoms.

* * * * *